Patented Oct. 18, 1927.

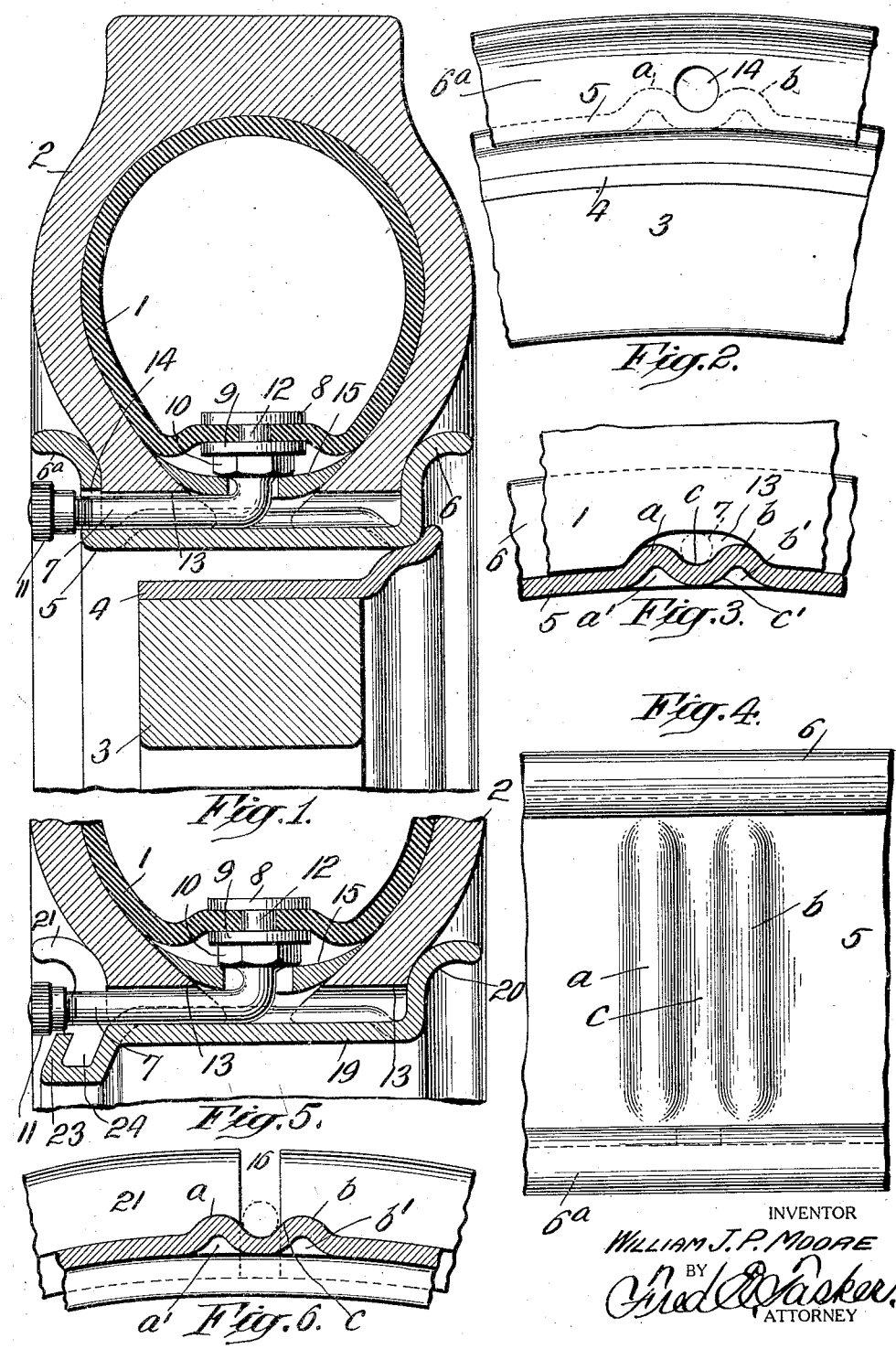

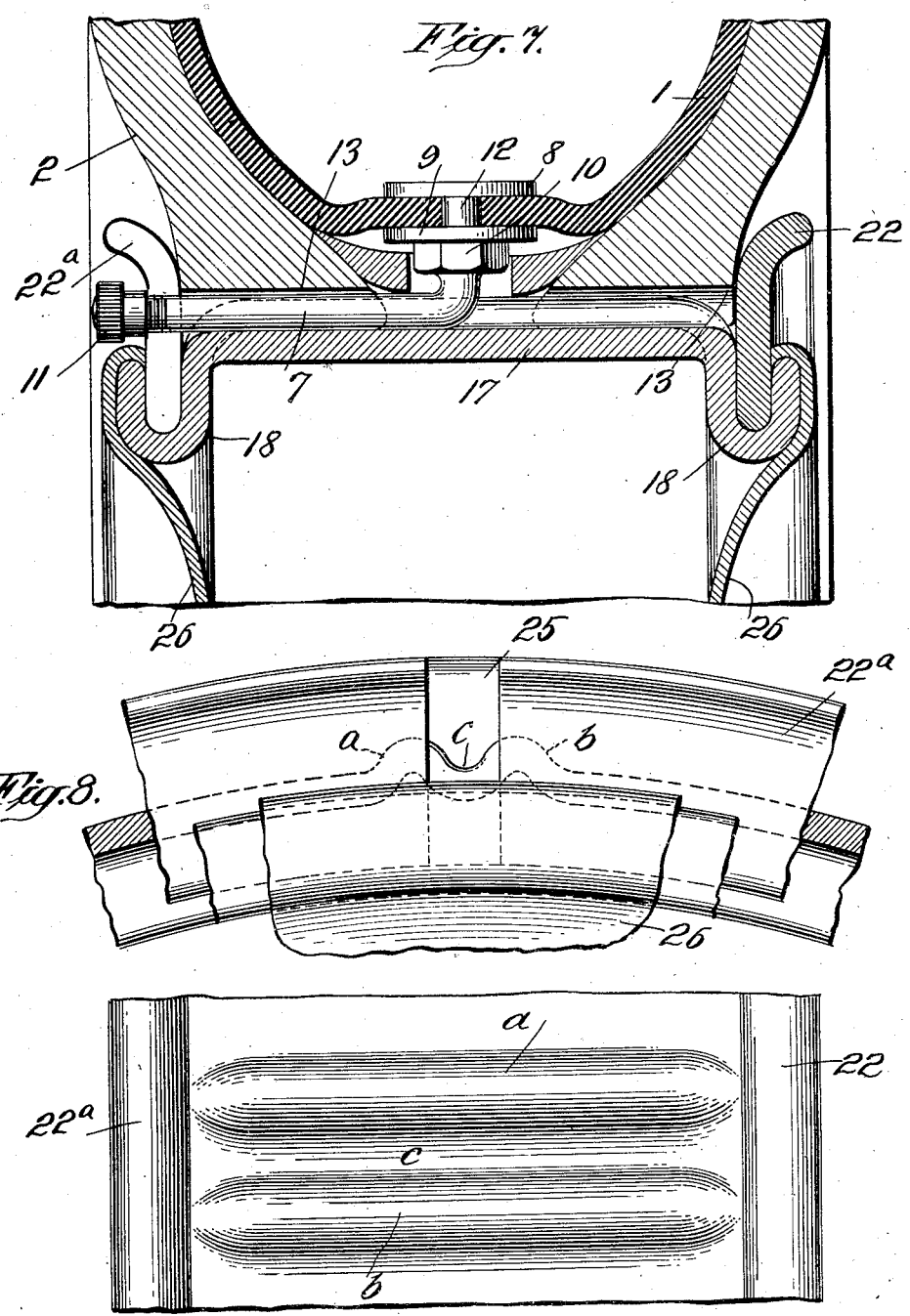

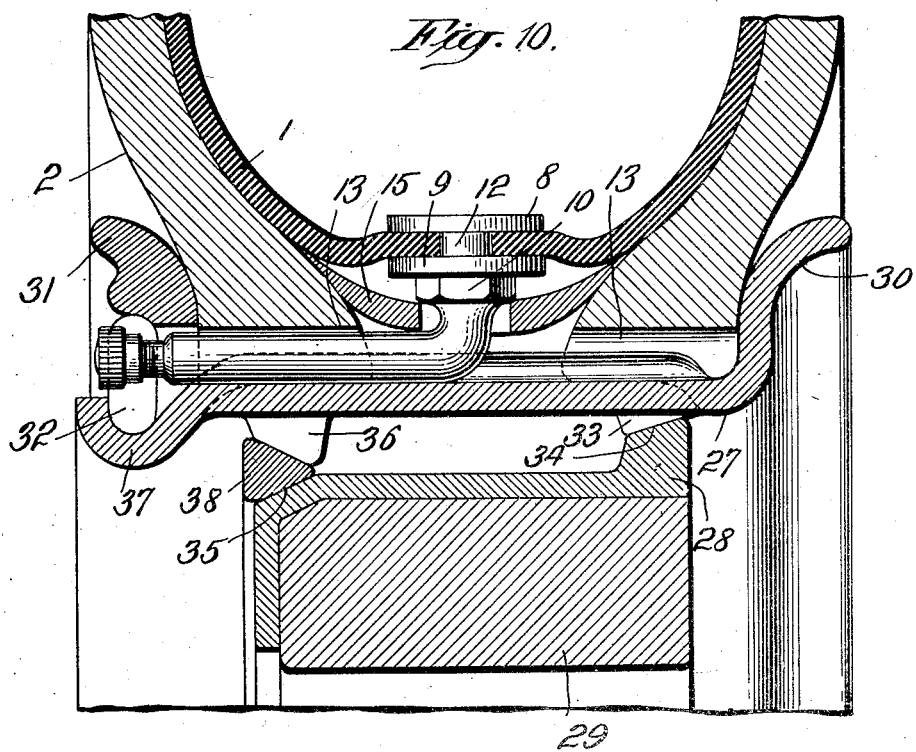
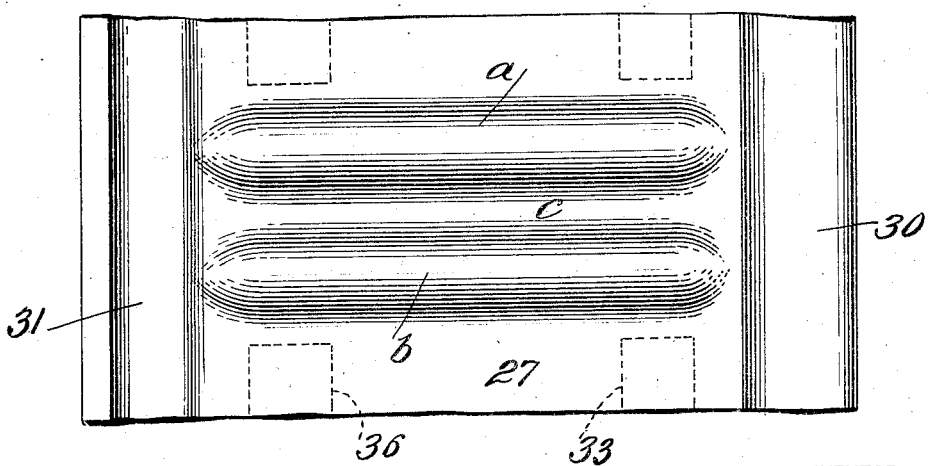

1,645,921

UNITED STATES PATENT OFFICE.

WILLIAM J. P. MOORE, OF NEW YORK, N. Y.

INTERLOCK FOR PNEUMATIC-TIRE CASINGS, INNER TUBES, AND WHEEL RIMS.

Application filed April 9, 1924. Serial No. 705,303.

This invention relates to certain new and useful improvements in means for interlocking a pneumatic tire casing, its inner tube and the wheel rim, or the casing and the rim, so that they cannot move relatively to each other. Thus I avoid creeping of the casing and strain upon the inner tube, and at the same time utilize these advantages by so constructing and locating the valve stem of the inner tube, that it can be more easily manipulated when the tire and rim are being removed from or reseated upon the periphery of the wheel. Also this makes the stem more readily accessible at all times; for the rim, casing, and inner tube are by my improved means so interlocked relatively to each other that under all conditions of working, whether the inner tube is inflated or deflated, they cannot move relatively to each other, for such a movement is especially destructive to the inner tube. Further, as the casing is always secured or locked at a fixed position on the rim, whether the inner tube is inflated or deflated, the casing cannot creep upon the rim and put excessive strain upon the inner tube, especially at the valve stem or any other part of the inner tube, and thereby injure or destroy it.

The invention consists essentially in an interlocking means for the rim, valve stem and casing, or the rim and casing, which is produced by elevating or embossing the base of the rim outwardly for the greater or less part of its width, or in making equivalent ridges, lugs, beads or protuberances of larger or smaller size. This is applicable to all existing forms of standard tire rims now in common use, and to all similar forms that may be devised. The embossing or other result may be produced by taking any such standardly finished rim and putting it into a suitable press and embossing two inverted V or U elevations across the external flat and slightly rounded surface of the rim; and such an operation can be performed as rapidly as the rims can be introduced into the press and the required movement of the press executed, or say, at the rate of five to ten a minute. The embossings provide a groove or hollow space in which the bent valve stem is held at all times in a fixed and rigid position transversely across the width of the base of the rim. Moreover the casing is provided with a wide inverted U recess adapted to straddle or embrace the embossed lines of the rim, so that the casing may thus be absolutely prevented from creeping on the rim, whether the tire is inflated more or less or is fully deflated from a puncture, leak or other cause; and this provides a lock between the rim and casing, whatever kind of valve stem is used, whether straight or bent.

As is well-known, in ordinary practice the air filling valve for introducing air pressure into the inner tube is carried by the inner tube in a position where it is in line with the extension of a radius of the circle formed by the inner tube when inflated, and the rim and felloe of the wheel are provided with openings through which the valve stem is caused to pass when the tire is being mounted upon the wheel; but the manipulation of the valve and the passing of the stem through said openings is attended with much difficulty, and often cannot be performed owing to the lack of a proper proportioning of the parts, the extent of the inflation of the inner tube at the time, and the inability to lift the valve device back from the opening and so center it that it will drop into its proper location with reference to all the parts, and it becomes virtually impossible with tires having large diameters and wide tire seats; for as the diameter of the tire increases, it becomes more and more difficult and practically impossible to angle on the inflated tire with straight valve stem, and it also becomes equally impossible to get at the end of the valve in the wide-felloed and multi-spoked wheels and wire and disc wheels, so it becomes equally necessary to find a more accessible position for the end of the valve stem. In disc wheels this has been tried by extending the valve stem through the rim and elbowing it and bringing it to the front face of the disc, but this requires a hole in the disc, and the tire is just as difficult to mount on the rim.

Other attempts have been made to avoid these difficulties by bending the outer part of the valve tube, casing or stem at a right angle to the part that is radially secured to the tube, and projecting the outer portion of the valve device outwardly sidewise, so that it will not have to be slipped through radial openings in the rim and felloe; but such efforts have hitherto proved abortive, because other advantages have been sacrificed, the rim has been weakened by the making of improper openings to try to accommodate the changed position of the valve stem, or there has been a complexity or multiplication of parts in another direction which has offset all the important advantages of the new arrangement of the valve device. With my present improved arrangement I overcome previous difficulties, and by locating the bent valve stem outside the embossed or beaded rim the tire does not have to be angled over the rim, but is pushed straight on laterally, and naturally the tire casing can be made a better fit on the rim and is more easily mounted or demounted.

In order to clearly point out the application of my present improvements to various forms of rims I have illustrated the same in connection with several such leading forms, but merely by way of example and with no intention of restricting the use of the invention thereto, as it will serve with a very great variety of wheels and rims. The invention consists essentially therefore in the means herein set forth for accomplishing the end in view, and in numerous details and peculiarities thereof, substantially as will be hereinafter more fully described and claimed.

In the accompanying drawing illustrating my invention,

Figure 1 is a cross-section of a one-piece straight-side rim, and a portion of a wheel, with my present improved interlock for the casing, tube and rim shown as practically applied thereto.

Figure 2 is a side view of a portion of the same.

Figure 3 is a partial longitudinal section of the embossed rim, and a side view of the recessed portion of the casing embracing the embossings.

Figure 4 is a partial plan view of the embossed rim and indicates the valve-stem receiving space between the embossings.

Figure 5 is a cross-section of a two-piece straight-side form of rim, with my present invention applied thereto.

Figure 6 is a sectional side view of the same.

Figure 7 is a cross-section of a three-piece straight-side rim for a double disc type of wheel, for the purpose of showing the adaptability of my improvements thereto.

Figure 8 is a partial side view and Figure 9 a partial plan view of the same.

Figure 10 is a cross-section of a form of straight-side three-piece rim showing demountable features and with my improvements arranged therewith.

Figure 11 is a plan view of the embossed rim shown in Figure 10.

Similar characters of reference denote like parts throughout the different figures of the drawing.

Referring first to the one-piece straight-side rim shown in Figures 1, 2, 3, and 4, it will be seen that 1 denotes the inner tube, 2 the outer casing or shoe, 3 the wooden felloe of the wheel, 4 the metal felloe band carried by said felloe, 5 the rim which is demountable and which has the circular flaring straight sides 6 and 6ª. The inflatable tube 1 carries the air filling valve whose stem 12 passes through the material of the tube 1 and has an inner disc 9 and an outer head flange 8 against which former bears the lock nut 10. The stem or tube 7 of the valve device which is integral with the stem 12 turns at a right angle to stem 12 and projects outwardly in a horizontal direction and through the perforation 14 in the side 6ª of rim 5, the projecting end of tube 7 carrying the usual milled dust cap 11 if desired, and in this way by having the valve tube 7 project outwardly beyond the wheel the valve is made easily accessible at all times and protected by the outwardly curved side flange. It is unnecessary to show or descrbe the inner mechanism of the valve for filling the tube 1 with air pressure as the same is well known and may vary as desired. The single piece rim 5, which in this form is shown as a demountable rim capable of being demounted from the wheel by a lateral movement from off the felloe band 4, and then remounted whenever desired by a return lateral shift, is embossed or stamped to form a pair of parallel transverse ridges $a$ and $b$ on the outside of the base of the rim, beneath which on the inside of said base 5 will be the grooves $a'$ and $b'$ due to the elevation or embossing outwardly of the ridges $a$ and $b$, said ridges, embossings, or the like, having the form of inverted V or U elevations, though of course they may be shaped otherwise if preferred, and between said ridges or embossings $a$ and $b$ will be formed the rounded hollow groove or channel $c$ for the reception of the valve stem 7, it being observed that the bottom of groove $c$ is simply the face of the base 5 of the rim or a part of the rim left at a certain point by lifting or stamping out the embossings $a$ and $b$, and said bottom of groove $c$ is therefore a part of the circle of the rim, having the same radius as the remainder of the rim, and is merely a hollow and not a groove or recess cut in the rim; hence the rim is of the same thickness and strength throughout and is unchanged from its usual state except for the embossed members that provide stops on each side of the valve stem to lock it to the rim loosely or so that the relative location of the two cannot change.

It should be emphasized that this embossed construction is effected without in any way cutting into the base or flat portion of rim 5, or even depressing the rim base, or in any way cutting into the side flanges of the two or three piece rims which have at least one loose side flange, as I shall presently more fully show; for the bent valve stem 7 is allowed to pass through to the outside of the wheel between the two cut ends of the side flange, in many cases, which side flange is obliged to be cut to allow it to be sprung into the recess of the rim provided for its seating. It is only in the case of a single piece rim like that shown in Figure 1 that the side flange, as 6ª, is cut through, and this is only by piercing or drilling a small drill hole, as 14, above the base of rim 5, for the passage of the stem 7, which hole 14 does not in any way weaken the rim construction.

Another important feature of my invention, as above suggested, consists in providing the shoe or casing 2 with an external wide shallow inverted U recess 13 to straddle the pair of embossings $a$ and $b$ and the intervening valve stem 7 as shown very clearly in Figure 3, and keeps the shoe from creeping on the rim. With all pneumatic tires, in the event of deflation the tire casing will always creep, especially on the driving wheels, and any movement of the casing will soon completely destroy the inner tube, unless the tube creeps along with the shoe and at the same speed, but when the ordinary straight valve stem is held by the valve stem nut any joint movement of the tube and shoe is prevented and hence the inner tube is quickly destroyed. Even when the tube is fully inflated the casing will oftentimes creep and destroy the inner tube, especially with moderately high air pressures, and it was to overcome this defect that the early "screw-down lugs" so-called were invented and introduced, but with the larger size tires and the heavier air pressures their use was discontinued, leaving no protection from the destruction of the inner tube, especially in case of deflation. Moreover with the introduction of the so-called "balloon" type of tires, using lighter air pressures and practically only one half the air pressure used in the standard heavy air pressure pneumatic tires, this low air pressure is found to be insufficient to keep the tires from creeping on the rim and some form of locking device again becomes essential, either by resorting to the old fashioned separate screw down lugs or the simpler arrangement shown and described in my present invention.

In Figures 5 and 6 I have shown my present invention applied for use with a rim of the straight-sided two-piece type. Here the shoe 2 and inner tube 1 are partly shown, and the inner tube 1 carries the air filling valve device which is the same as that shown in Figures 1 to 4, and comprises a radial stem 12 secured to the tube and provided with inner disc 9, outer head plate disc 8 and nut 10, and the stem 12 connects with the right-angled air-admission tube or stem 7 having cap 11. The rim 19 has the integral inner side 20 and the separate outer side ring 21 having the flange 24 which springs into the circular groove 23 at the outer edge of rim 19. This loose side ring 21 is cut at 16, see Figure 6, as above stated to allow it to be sprung into the recess 23 provided for its seating in the rim; and between the two ends of ring 21, through space 16, the bent valve stem passes to the outside of the wheel. Further the rim 19 in order to carry my invention into effect is embossed at $a$ and $b$ to provide the hollow $c$ for the interlocking of the rim and the valve stem the same as in Figures 1 to 4.

A form of wheel of the double disc type is illustrated in Figures 7, 8, and 9, in order to still further demonstrate the wide applicability of my improved interlocking means to different kinds of wheel rims with which pneumatic tires are employed. It is unnecessary to again describe the tire and the details of the valve mechanism, as they are the same as in the other figures of the drawing. So far as the wheel and its rim are concerned, however, 17 denotes the rim, which is provided with circular grooves near each edge at 18 in which are seated the interchangeable side rings 22 and 22ª, said side ring 22ª being cut at 25, see Figure 8, to have a space so that the stem 7 of the valve can pass out between these ends of the ring. The two discs 26 are secured to the opposite edges of the rim 17 to make the disc wheel. The embossings $a$ and $b$ and hollow $c$ are the same as in the other figures of the drawings, see Figures 8 and 9.

Passing now to Figures 10 and 11 I present another well known type of rim having certain demountable features, and a rim characterized by having three main pieces and straight sides. The valve device, casing and inner tube and flap are the same as in the other views; and the bent valve stem 7 is arranged in like manner as before. 27 denotes the rim which is demountable, and which has an integral inner side 30 and a removable uncut outer side ring 31 with a semi-circular cut in the bottom where the valve stem passes through, which ring 31 locks with the cut ring 32 that seats in a circular groove 37 in the rim 27 near the outer edge thereof. The rim 27 has an incline-faced flange 33 on the underside thereof that engages an inclined face 34 on the surface of the felloe band 28 carried by the felloe 29; also on the under side of rim 27 is another wedging face 36 between which and the inclined face 35 of the band 28 a wedging ring 38 operates to hold the parts together (by clamps and other devices not shown). It is unnecessary to supply further details of the construction, as I only desire to show how my interlock functions in the case of a three-piece rim. The base of the rim 27 has the same embossed ribs or elevations $a$ and $b$ and hollow $c$, for the bent valve stem 7, as in the other cases, and said stem passes between the ends of split ring 32 and through a semi-circular groove in bottom of ring 31. The shoe 2 has the straddling recess or recesses 13 for grasping the embossings of the rim as in Figures 1 to 4, and also in Figures 5 to 9. In fact without repetition it may be understood that the casing 2 always uses this locking recess when it is desired to create the triple interlock.

In further discussion of the value of my present invention, and the useful effects realized thereby, it may be said that in many of the present designs of pneumatic tire casings having a wide open space between the two inturned toes or fore feet of the so-called "horse-shoe" or inverted U-shaped tires, there is produced an unbalanced pressure corresponding to the width of the opening and extending completely around the rim, multiplied by the air pressure, which tends to stretch the complete casing and hold the base of the tire off the rim, so that in a short time the casing does not even touch the base of the rim, by one-sixteenth to one-eighth of an inch and is only held in place by the side flange of the rim, and it is only the friction against the side flanges that holds the casing from creeping where the tire is inflated, and naturally when deflated the driving wheel tire casing actually moves rapidly on the rim, since its movement is practically unrestrained. It has been claimed by some that such an air suspension has advantages, but I believe that experience demonstrates it to be extremely damaging to the tire, and hence it ought to be prevented.

In any case, therefore, in order to hold the casing on the rim, it is essential that the base of the tire casing extend almost continuously across the rim, and be held down by the air pressure when inflated, and if the base of the tire casing is not continuous, a flap, as 15, sufficiently thick to produce in effect a continuous base for the casing must be used while such an arrangement might serve somewhat when the tire is inflated to a sufficiently high pressure, it has no value in the case of a puncture or deflation.

Another advantage of the pneumatic tire casing having a practically continuous base is that, being firmly held to the tire rim by the air pressure, it is firmly seated on the rim for its entire width, and the lateral stability of the tire is considerably increased (same as a dam held down by the pressure of the superimposed weight of water), and further such a tire does not need a metallic bead, as only centrifugal force tends to make the tire fly off the rim, and as the speed of wheels never exceeds 600 to 700 R. P. M. this force is limited. However, with the proposed unloading of tires and the use of larger sizes and lower air pressures, the continued use of tires without holding or interlocking devices of some sort is impossible, and either there must be a reversion to the use of the discarded and ineffective "screw-down lug" already referred to, or an efficient interlock must be provided. I believe that by my present improved triple interlock I have met this great need and furnished an effective means for curing the tire troubles described.

Having thus described my invention, what I claim as new and desire to secure by Letters Patent, is:

1. A wheel rim having transverse embossings or ribs for supporting between them the valve device of the inner tube of a pneumatic tire and for engaging a recess in the periphery of a recessed casing to prevent the casing from creeping on the rim.

2. A wheel rim having transverse embossings or ribs extending across the face of the rim to provide a hollow for receiving the air valve device of an inflatable inner tube, and for engaging the recess in a recessed casing to prevent the casing from creeping on the rim, which hollow is a part of the face of the rim and a part of the circle of the rim with the same radius as the remainder of the rim.

3. A flanged wheel rim having transverse embossings for receiving the valve device of an inner tube, a flange of which rim is provided with an opening opposite to the groove between the embossings through which opening one end of the valve device projects, said embossings being also for the purpose of engaging the recess in a recessed casing to prevent the casing from creeping on the rim.

4. A wheel rim having transverse parallel embossings extending across the face of the rim to provide a hollow for receiving the air valve device of a tire between the embossings, said embossings being stamped out of the rim so as to leave said rim of the same thickness throughout and so that the hollow may be a part of the face of the rim and a part of the circle of the rim with the same radius as the remainder of the rim, and said embossings engaging a recess in a recessed casing to prevent the casing from creeping on the rim.

5. A wheel rim having a side member and transverse embossings, which latter provide a hollow between them for supporting a tire valve device which projects through the side member, said rim having the embossings stamped out of the same, and said embossings engaging the recess in a recessed casing to prevent the casing from creeping on the rim.

6. A wheel rim having transverse embossings extending from one edge to the other to form a rounded hollow to support the right-angled part of a tire-valve device, said embossings being stamped from the rim to leave the rim of the same thickness throughout, and to engage the recess in a recessed casing to prevent the casing from creeping on the rim.

7. A rim having transverse embossings to provide a hollow and a side having an opening in alignment with the hollow, for receiving a tire valve device, in combination with a tire comprising a shoe and an inner tube carrying said valve device, the part of the latter which is attached to the inner tube being at right angles to the part in the hollow in the rim, said embossings engaging a recess in the periphery of the shoe to prevent creeping.

8. A rim having transverse parallel embossings to provide a hollow and a side having an opening in alignment with the hollow, for receiving a tire valve device, in combination with a tire comprising a shoe and an inner tube carrying said valve device, the part of the latter which is attached to the inner tube being held at right angles to the part in the hollow in the rim, said hollow being a part of the circle of the rim, and said embossings engaging a recess in the periphery of the shoe to prevent creeping.

In testimony whereof I hereunto affix my signature.

WILLIAM J. P. MOORE.